(12) United States Patent
Furukawa et al.

(10) Patent No.: US 11,492,446 B2
(45) Date of Patent: Nov. 8, 2022

(54) SEMIPREG, PREPREG, RESIN COMPOSITE MATERIAL, AND PRODUCTION METHODS THEREOF

(71) Applicants: KANEKA CORPORATION, Osaka (JP); JAPAN AEROSPACE EXPLORATION AGENCY, Chofu (JP)

(72) Inventors: Yoshio Furukawa, Settu (JP); Takefumi Furuta, Settu (JP); Takeshi Chiba, Settu (JP); Rikio Yokota, Settu (JP); Yuichi Ishida, Chofu (JP)

(73) Assignees: KANEKA CORPORATION, Osaka (JP); JAPAN AEROSPACE EXPLORATION AGENCY, Chofu (JP)

( * ) Notice: Subject to any disclaimer, the term of this patent is extended or adjusted under 35 U.S.C. 154(b) by 390 days.

(21) Appl. No.: 16/498,227

(22) PCT Filed: Mar. 22, 2018

(86) PCT No.: PCT/JP2018/011528
§ 371 (c)(1),
(2) Date: Dec. 16, 2019

(87) PCT Pub. No.: WO2018/180930
PCT Pub. Date: Oct. 4, 2018

(65) Prior Publication Data
US 2020/0148846 A1    May 14, 2020

(30) Foreign Application Priority Data
Mar. 30, 2017    (JP) .............................. JP2017-067689

(51) Int. Cl.
*C08G 73/12*    (2006.01)
*B29C 70/10*    (2006.01)
(Continued)

(52) U.S. Cl.
CPC .............. *C08G 73/12* (2013.01); *B29C 70/10* (2013.01); *C08J 5/042* (2013.01); *C08J 5/121* (2013.01); *C08J 5/243* (2021.05); *C08J 2379/08* (2013.01)

(58) Field of Classification Search
CPC . C08J 2379/08; C08J 5/24; C08J 5/042; C08J 5/243; C08J 5/121; C08L 79/08;
(Continued)

(56) References Cited

U.S. PATENT DOCUMENTS

| 4,687,836 A | 8/1987 | Ibi et al. |
| 5,013,817 A | 5/1991 | Ohta et al. |

(Continued)

FOREIGN PATENT DOCUMENTS

| CN | 101346413 A | 1/2009 |
| CN | 105764989 A | 7/2016 |

(Continued)

OTHER PUBLICATIONS

Extended European Search Report dated Dec. 23, 2020 in European Patent Application No. 18774314.1, 7 pages.

(Continued)

*Primary Examiner* — Camie S Thompson
(74) *Attorney, Agent, or Firm* — Oblon, McClelland, Maier & Neustadt, L.L.P.

(57) ABSTRACT

An object of the present invention is to reduce or eliminate a defect (e.g., a void) by achieving (i) a semipreg and a prepreg each of which allows a reduction in residual volatile component and (ii) methods for producing the semipreg and the prepreg, respectively, and consequently to achieve (iii) a fiber-reinforced composite material which has high heat resistance and superior mechanical strength and a (iv) method for producing the fiber-reinforced composite material. The present invention attains the above object by (Continued)

providing, for example, a semipreg containing: powders of an imide oligomer; and reinforcement fibers, the imide oligomer being represented by a specific general formula (1).

13 Claims, 2 Drawing Sheets

(51) Int. Cl.
*C08J 5/04* (2006.01)
*C08J 5/12* (2006.01)
*C08J 5/24* (2006.01)

(58) Field of Classification Search
CPC .. C09D 179/08; C07D 209/48; C07D 487/04; Y10T 428/24994; Y10T 428/24995; Y10T 442/2631; Y10T 442/67; Y10T 442/69; C08K 7/02; B29C 70/10
USPC ............ 428/297.4; 524/104, 600; 427/385.5; 156/307.3
See application file for complete search history.

(56) References Cited

U.S. PATENT DOCUMENTS

| | | | |
|---|---|---|---|
| 5,130,444 A | 7/1992 | Horacek et al. | |
| 2005/0080229 A1 | 4/2005 | Deets et al. | |
| 2006/0142540 A1 | 6/2006 | Deets et al. | |
| 2011/0165809 A1* | 7/2011 | Miyauchi | C08F 290/065 442/392 |
| 2011/0301285 A1 | 12/2011 | Deets et al. | |
| 2014/0011950 A1* | 1/2014 | Miyauchi | C08G 73/105 524/600 |
| 2016/0083618 A1 | 3/2016 | Miyauchi et al. | |
| 2017/0152399 A1* | 6/2017 | Miyauchi | C08G 73/10 |
| 2017/0190841 A1 | 7/2017 | Deets et al. | |
| 2018/0273798 A1 | 9/2018 | Miyauchi et al. | |
| 2019/0071541 A1* | 3/2019 | Furuta | C08G 73/1014 |

FOREIGN PATENT DOCUMENTS

| | | |
|---|---|---|
| EP | 0 179 604 A2 | 4/1986 |
| EP | 2 333 004 A1 | 6/2011 |
| EP | 2 687 508 A1 | 1/2014 |
| JP | 47-11490 A | 6/1972 |
| JP | 61-98744 A | 5/1986 |
| JP | 1-121363 A | 5/1989 |
| JP | 3-501032 A | 3/1991 |
| JP | 4-252234 A | 9/1992 |
| JP | 2007-191659 A | 8/2007 |
| JP | 2009-521560 A | 6/2009 |
| JP | WO2010/027020 A1 | 3/2010 |
| JP | 2014-218632 A | 11/2014 |
| JP | 2016-216720 A | 12/2016 |
| WO | WO 2014/181670 A1 | 11/2014 |
| WO | WO 2015/174217 A1 | 11/2015 |

OTHER PUBLICATIONS

Combined Chinese Office Action and Search Report dated Aug. 6, 2021 in Chinese Patent Application No. 201880022665.9 (with English translation), 14 pages.
Notice of Reasons for Refusal dated Oct. 12, 2021 in Japanese Patent Application No. 2019-509685 (with English machine translation), 17 pages.
International Search Report dated Apr. 24, 2018 in PCT/JP2018/011528, 2 pages.
English translation of the International Preliminary Report on Patentability dated Oct. 10, 2019 in PCT/JP2018/011528 filed Mar. 22, 2018, 9 pages.

* cited by examiner

SEMIPREG, PREPREG, RESIN COMPOSITE MATERIAL, AND PRODUCTION METHODS THEREOF

TECHNICAL FIELD

The present invention relates to a semipreg, a prepreg, a resin composite material, and methods for producing the semipreg, the prepreg, and the resin composite material, respectively.

BACKGROUND ART

Aromatic polyimides have heat resistance which is of the highest level among polymeric substances and also exhibit superior mechanical characteristics, electrical characteristics, and the like. For these reasons, aromatic polyimides are used as a raw material in a wide range of fields, including aerospace and electrics/electronics.

However, aromatic polyimides generally have poor processability, and thus are particularly unsuited for use in melt molding and for use as a matrix resin in a fiber-reinforced composite material. For this reason, in cases where an aromatic polyimide is to be used as a matrix resin for a fiber-reinforced composite material, a polyimide capable of a thermal addition reaction is typically used. Specifically, a low-molecular-weight imide oligomer is impregnated into fibers and then the resin is crosslinked and cured in a final step.

For example, Patent Literature 1 discloses a technique for obtaining a prepreg. The technique is specifically carried out as below. Reinforcement fibers are immersed in a suspension which is prepared by dispersing imide oligomer powders in a dispersion medium. Then, the dispersion medium is volatilized by heating the reinforcement fibers. Subsequently, the imide oligomer powders are heated and melted so as to be impregnated into the reinforcement fibers. The imide oligomer powders are further cooled and solidified. A prepreg is thus obtained.

In contrast, according to Patent Literature 2, a prepreg is produced by using a mixture, obtained by mixing an imide oligomer having a lower molecular weight with a thermoplastic polyimide, so that the imide oligomer has lower melt viscosity while being heated.

CITATION LIST

Patent Literatures

[Patent Literature 1]
Japanese Patent Application Publication Tokukai No. 2007-191659

[Patent Literature 2]
Japanese Patent Application Publication Tokukai No. 2016-216720

SUMMARY OF INVENTION

Technical Problem

In the technique disclosed in Patent Literature 1, a suspension is used which is prepared by dispersing imide oligomer powders in a dispersion medium. This causes the following problem. Specifically, a volatile component such as a dispersion medium remains in a prepreg and volatilizes during forming of a fiber-reinforced composite material. This causes the fiber-reinforced composite material to have a defect such as a void and have lower heat resistance. Under the circumstances, a new technique that allows a reduction in residual volatile component has been desired to be developed. The technique disclosed in Patent Literature 2 is also considered to have room for improvement from the viewpoint of, for example, (i) prevention or reduction of a void and (ii) heat resistance.

An aspect of the present invention has been made in view of the problems and has an object to achieve (i) a semipreg, a prepreg, and a resin composite material each of which has high heat resistance and allows a reduction in residual volatile component and (ii) methods for producing the semipreg, the prepreg, and the resin composite material, respectively.

Solution to Problem

In order to attain the object, the inventors of the present invention carried out diligent study and then found the following: (a) that a semipreg in which substantially no volatile components such as a solvent and a dispersion medium are used is obtained by mixing powders of an imide oligomer with reinforcement fibers without using any volatile component such as a dispersion medium; and (b) that an imide oligomer having a specific structure is particularly preferably used. The inventors of the present invention thus finally accomplished the present invention. Specifically, an aspect of the present invention includes the following.

A semipreg containing: powders of an imide oligomer; and reinforcement fibers, the imide oligomer being represented by the following general formula (1):

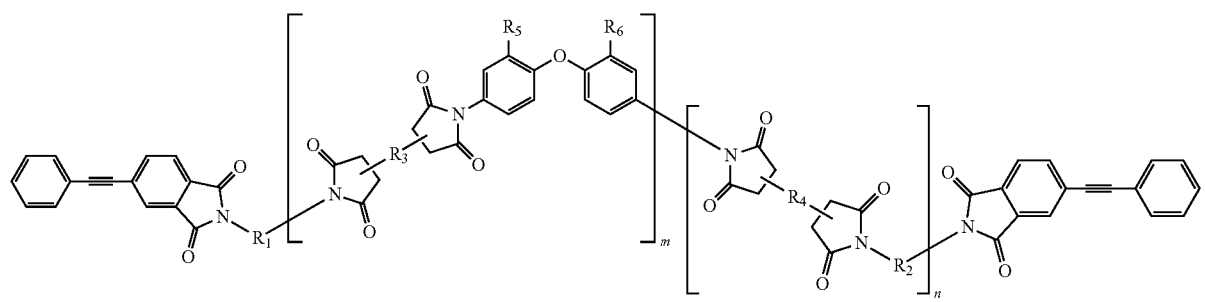

(1)

wherein $R_1$ represents a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_2$ represents a divalent residue of at least one aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_3$ and $R_4$, which are identical or different, each represent a tetravalent residue of an aromatic tetracarboxylic acid;

one of $R_5$ and $R_6$ represents a phenyl group, and the other one of $R_5$ and $R_6$ represents a hydrogen atom;

m and n satisfy the following:
$1 \leq m$,
$0 \leq n \leq 5$,
$1 \leq m+n \leq 10$, and
$0.5 \leq m/(m+n) \leq 1$; and a sequence of repeating units may be a block sequence or a random sequence.

A method for producing a semipreg, including the step of mixing powders of an imide oligomer with reinforcement fibers in a dry step.

A method for producing a resin composite material, including the steps of:

(a) producing a semipreg or a prepreg by adhering powders of an imide oligomer to reinforcement fibers and then carrying out heating;

(b) obtaining a stack by layering the semipreg or the prepreg obtained in the step (a), and then maintaining the stack at 260° C. to 320° C. and 0.1 MPa to 20 MPa for 5 minutes to 300 minutes; and (c) further maintaining, at 330° C. to 500° C. and 0.1 MPa to 20 MPa for 15 minutes to 120 minutes, the stack which has undergone the step (b).

Advantageous Effects of Invention

An aspect of the present invention provides a semipreg and a prepreg each of which has a lower residual volatile component content. According to an aspect of the present invention, a semipreg or a prepreg which has a lower residual volatile component content is used to form a fiber-reinforced composite material. This brings about an effect of obtaining a fiber-reinforced composite material in which a defect (e.g., a void) to be produced by evaporation or decomposition of a residual volatile component has been reduced or eliminated and which has high heat resistance and superior mechanical strength.

DESCRIPTION OF EMBODIMENTS

Figure 1:
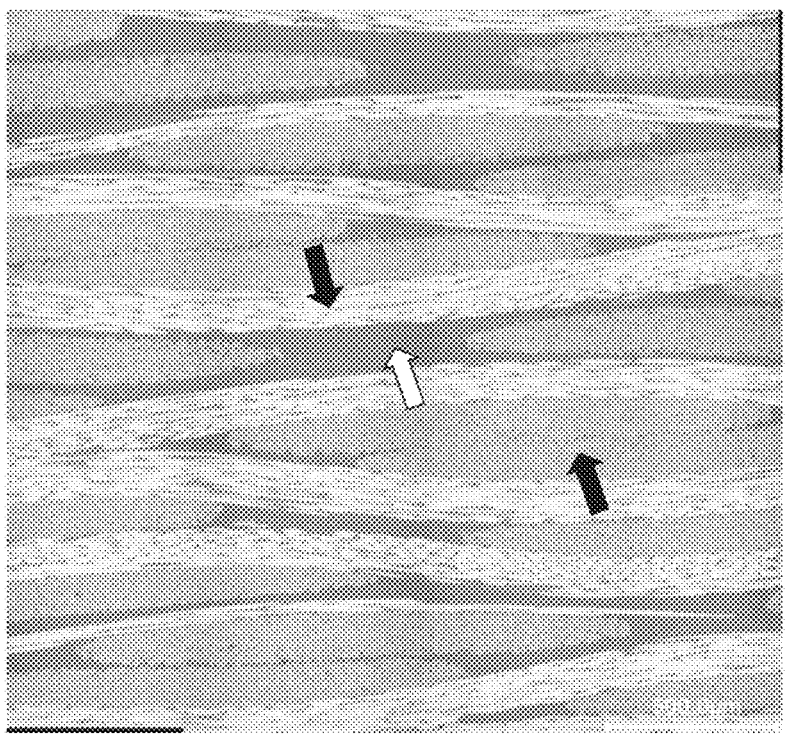
FIG. 1 is a view illustrating a cross section, observed by use of an optical microscope, of a carbon fiber reinforced composite material (CFRP-1) of Example 1.

The following description will discuss an embodiment of the present invention in detail. Any numerical range expressed as "A to B" herein means "not less than A and not more than B (i.e., a range from A to B which includes both A and B)" unless otherwise stated.

[1. Semipreg]

An embodiment of the present invention provides a semipreg containing: powders of an imide oligomer; and reinforcement fibers, the imide oligomer being represented by the following general formula (1):

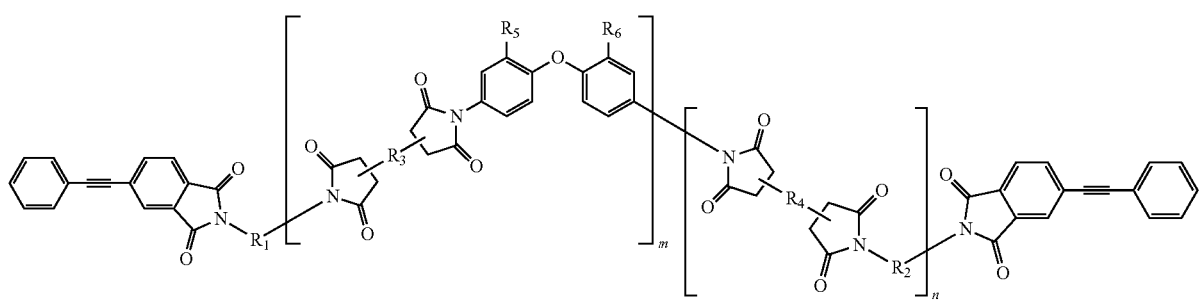

(1)

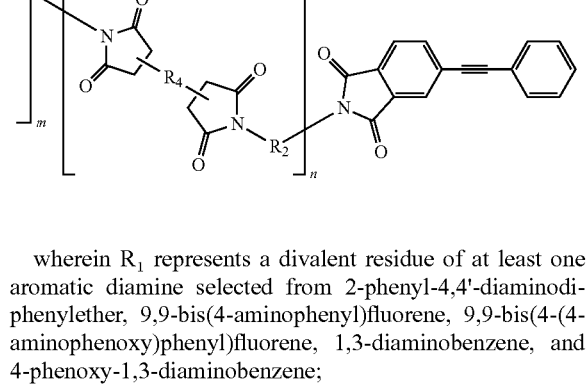

wherein $R_1$ represents a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_2$ represents a divalent residue of at least one aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_3$ and $R_4$, which are identical or different, each represent a tetravalent residue of an aromatic tetracarboxylic acid;

one of $R_5$ and $R_6$ represents a phenyl group, and the other one of $R_5$ and $R_6$ represents a hydrogen atom;

m and n satisfy the following:
$1 \leq m$,
$0 \leq n \leq 5$,
$1 \leq m+n \leq 10$, and
$0.5 \leq m/(m+n) \leq 1$; and a sequence of repeating units may be a block sequence or a random sequence.

A semipreg in accordance with an embodiment of the present invention is produced by mixing powders of an imide oligomer and reinforcement fibers without using any volatile component such as a solvent or a dispersion medium. This makes it possible to provide a semipreg which has a lower residual volatile component content. Furthermore, a resin composite material produced by use of such a semipreg (e.g., a carbon fiber reinforced composite material) brings about an extremely advantageous effect of having a glass transition temperature equal to or higher than that of a simple resin due to reduction or elimination of a defect (e.g., a void) caused by volatilization and decomposition of, for example, a solvent. In the following description, the glass transition temperature may be merely referred to as "Tg".

According to the technique disclosed in Patent Literature 1, a low-molecular-weight imide oligomer which is less tough is impregnated into a space between respective reinforcement fibers. This causes a problem such that a prepreg produced is less drapeable, less handleable, and less formative. The technique disclosed in Patent Literature 2 has no particular problem with a residual volatile component. Note, however, that a cured product tends to have low heat resistance (e.g., 5% weight reduction temperature) because a low-molecular-weight terminally modified imide oligomer which has a low degree of polymerization is used in the technique disclosed in Patent Literature 2. Such a tendency is considered to be shown mainly because of the following reason. Specifically, since an imide oligomer whose molecular weight is relatively low among terminally modified imide oligomers is used, a terminal capping agent which has relatively low heat resistance has a high concentration. Furthermore, according to the technique disclosed in Patent Literature 2, a cured product generally tends to have a lower glass transition temperature because thermoplastic polyimide is used in combination with the imide oligomer.

In contrast, according to an embodiment of the present invention, also in a case where an imide oligomer whose molecular weight is relatively high is used, it is possible to produce a semipreg, a prepreg, and a resin composite material without passing through a suspension of powders of the imide oligomer. Furthermore, a semipreg in accordance with an embodiment of the present invention can maintain drapeability. Moreover, a resin composite material in accordance with an embodiment of the present invention also has high heat resistance.

Note that the technique disclosed in Patent Literature 2 intends to produce a prepreg by, for example, layering a fiber fabric and a polyimide resin composition, formed into a sheet, so as to impregnate, into the fiber fabric, the polyimide resin composition which has been melted. That is, Patent Literature 2 does not intend to mix powders of an imide oligomer and reinforcement fibers.

The term "semipreg" herein means a resin-reinforcement fiber composite in which a resin (e.g., an imide oligomer) is partially impregnated into reinforcement fibers (is in a semi-impregnation state) so that the resin is integral with the reinforcement fibers. The "semipreg" includes, due to its semi-impregnation state, a fiber array into which no resin is impregnated. This prevents the semipreg from losing drapeability, so that the semipreg is highly formative with respect to a complicated shape. An aspect of the "semipreg" frequently refers to a form in which reinforcement fibers have, on their outer surfaces, a layer which is rich in resin.

Note that the term "drapeability" means an indicator showing how flexibly a resin-reinforcement fiber composite such as a semipreg or a prepreg (described later) deforms. The term "drapeability" shows how flexibly a resin-reinforcement fiber composite (e.g., a semipreg or a prepreg (described later)) which is deformed along another object (e.g., a mold) follows the shape of the another object without destruction or a breakage in reinforcement fibers. It is easy for a resin-reinforcement fiber composite which is highly drapeable to be formed so as to curve around a curved surface. In contrast, it is difficult for a resin-reinforcement fiber composite which is less drapeable to be formed so as to curve around a curved surface. It is a matter of course that it is difficult for a resin-reinforcement fiber composite which is less drapeable to be formed so as to have a complicated shape.

The term "imide oligomer" herein used is synonymous with the term "terminally modified imide oligomer" unless otherwise specified.

According to an embodiment of the present invention, a divalent residue of an aromatic diamine of each of $R_1$ and $R_2$ refers to an aromatic organic group existing between two amino groups in the aromatic diamine. A tetravalent residue of an aromatic tetracarboxylic acid refers to an aromatic organic group surrounded by four carbonyl groups in the aromatic tetracarboxylic acid. Here, "aromatic organic group" refers to an organic group having an aromatic ring. The aromatic organic group is preferably an organic group having 4 to 30 carbon atoms, more preferably an organic group having 4 to 18 carbon atoms, and even more preferably an organic group having 4 to 12 carbon atoms. The aromatic organic group is preferably a group having 6 to 30 carbon atoms and including hydrogen, more preferably a group having 6 to 18 carbon atoms and including hydrogen, and even more preferably a group having 6 to 12 carbon atoms and including hydrogen.

$R_1$ is a divalent residue of an aromatic diamine and is preferably a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl)fluorene, 1,3-diaminobenzene, and 4-phenoxy-1,3-diaminobenzene.

$R_2$ is a divalent residue of an aromatic diamine and is preferably a divalent residue of an aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene.

$R_3$ and $R_4$ are each a tetravalent residue of an aromatic tetracarboxylic acid and may be identical or different. The term "aromatic tetracarboxylic acid" herein encompasses an aromatic tetracarboxylic acid, an aromatic tetracarboxylic dianhydride, and acid derivatives (such as an ester and a salt) of an aromatic tetracarboxylic acid.

The tetravalent residue of the aromatic tetracarboxylic acid is preferably selected from residues derived from a 1,2,4,5-benzenetetracarboxylic acid. The term "1,2,4,5-benzenetetracarboxylic acid" encompasses 1,2,4,5-benzenetetracarboxylic acid, 1,2,4,5-benzenetetracarboxylic dianhydride (PMDA), and acid derivatives (such as an ester and a salt) of 1,2,4,5-benzenetetracarboxylic acid. In particular, the 1,2,4,5-benzenetetracarboxylic dianhydride is optimal.

$R_5$ and $R_6$ can also be described as being different ones of the group consisting of a hydrogen atom and a phenyl group. In a case where m>1, the imide oligomer may optionally contain a repeating unit in which $R_5$ is the phenyl group and $R_6$ is the hydrogen atom and a repeating unit in which $R_5$ is the hydrogen atom and $R_6$ is the phenyl group.

$R_1$ to $R_6$ may be different or identical in each repeating unit.

The expression "a sequence of repeating units may be a block sequence or a random sequence" herein means that the repeating units may be block polymerized or may be randomly polymerized.

According to an embodiment of the present invention, powders of an imide oligomer contained in a semipreg are preferably powders of an imide oligomer represented by the following general formula (2):

(2)

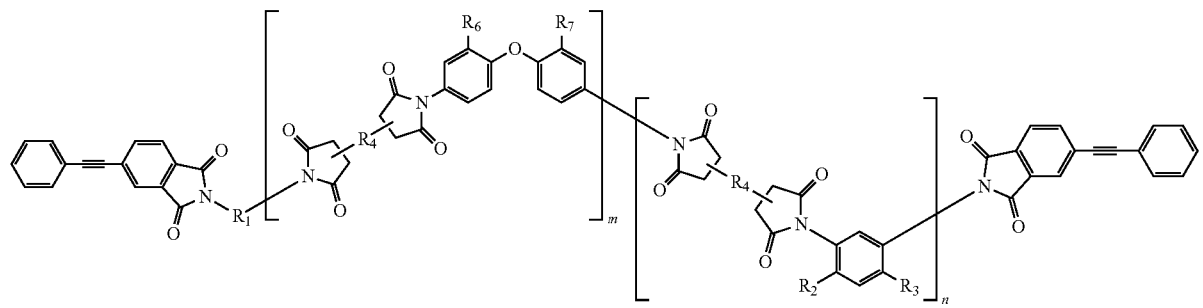

wherein $R_1$ represents a divalent residue of an aromatic diamine selected from 2-phenyl-4,4'-diaminodiphenylether and 4-phenoxy-1,3-diaminobenzene;

one of $R_2$ and $R_3$ represents a phenoxy group, and the other one of $R_2$ and $R_3$ represents a hydrogen atom;

$R_4$ and $R_5$, which are identical or different, each represent a tetravalent residue of an aromatic tetracarboxylic acid;

one of $R_6$ and $R_7$ represents a phenyl group, and the other one of $R_6$ and $R_7$ represents a hydrogen atom;

m and n satisfy the following:

$1 \leq m$,
$0 \leq n \leq 5$,
$1 \leq m+n \leq 10$, and
$0.5 \leq m/(m+n) \leq 1$; and a sequence of repeating units may be a block sequence or a random sequence.

$R_1$ is a divalent residue of an aromatic diamine and is preferably a divalent residue of an aromatic diamine selected from 2-phenyl-4,4'-diaminodiphenylether and 4-phenoxy-1,3-diaminobenzene.

$R_2$ and $R_3$ can also be described as being different ones of the group consisting of a hydrogen atom and a phenoxy group. In a case where n>1, the imide oligomer may optionally contain a repeating unit in which $R_2$ is the phenoxy group and $R_3$ is the hydrogen atom and a repeating unit in which $R_2$ is the hydrogen atom and $R_3$ is the phenoxy group.

The definitions of $R_4$, $R_5$, $R_6$, and $R_7$ in the general formula (2) are similar to those of $R_3$, $R_4$, $R_5$, and $R_6$, respectively, in the general formula (1).

$R_1$ to $R_7$ may be different or identical in each repeating unit.

According to an embodiment of the present invention, in a case where $R_4$ and $R_5$ in the general formula (2) are each a residue of a 1,2,4,5-benzenetetracarboxylic acid, the imide oligomer is represented by the following general formula (3):

(3)

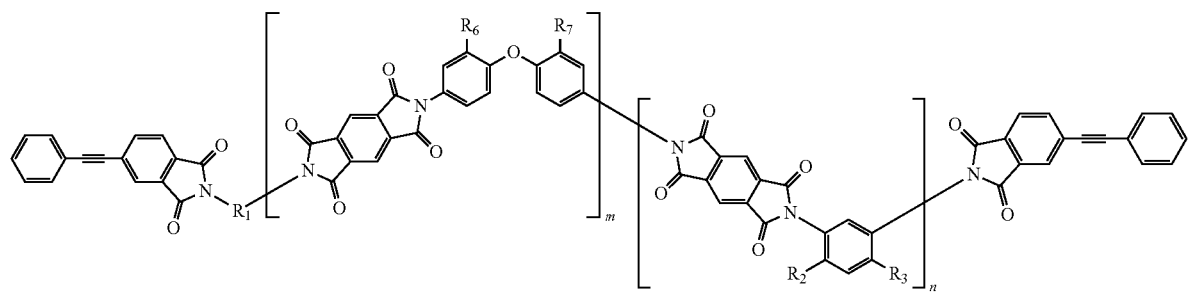

wherein $R_1$ represents a divalent residue of an aromatic diamine selected from 2-phenyl-4,4'-diaminodiphenylether and 4-phenoxy-1,3-diaminobenzene;

one of $R_2$ and $R_3$ represents a hydrogen atom and the other one of $R_2$ and $R_3$ represents a phenoxy group;

one of $R_6$ and $R_7$ represents a hydrogen atom and the other one of $R_6$ and $R_7$ represents a phenyl group;

m and n satisfy the following:

$1 \leq m$,
$0 \leq n \leq 5$,
$1 \leq m+n \leq 10$, and
$0.5 \leq m/(m+n) \leq 1$; and a sequence of repeating units may be a block sequence or a random sequence.

In the imide oligomer in accordance with an embodiment of the present invention, a 1,2,4,5-benzenetetracarboxylic acid may be used alone as the aromatic tetracarboxylic acid, or part of the 1,2,4,5-benzenetetracarboxylic acid may be substituted with another aromatic tetracarboxylic acid compound, to the extent that the effect of an embodiment of the present invention is still brought about. Examples of the "another aromatic tetracarboxylic acid compound" include 3,3',4,4'-biphenyltetracarboxylic dianhydride (s-BPDA), 3,3',4,4'-benzophenonetetracarboxylic dianhydride (BTDA), 2,3,3',4'-biphenyltetracarboxylic dianhydride (a-BPDA), 2,2',3,3'-biphenyltetracarboxylic dianhydride (i-BPDA), 2,2-bis(3,4-dicarboxyphenyl)methane dianhydride, bis(3,4-carboxyphenyl)ether dianhydride, and 1,2,3,4-benzenetetracarboxylic dianhydride.

In the imide oligomer in accordance with an embodiment of the present invention, 2-phenyl-4,4'-diaminodiphenylether, 9,9-bis(4-aminophenyl)fluorene, 9,9-bis(4-(4-aminophenoxy)phenyl)fluorene, 1,3-diaminobenzene, or 4-phenoxy-1,3-diaminobenzene of $R_1$ in the general formula (1), or part of 2-phenyl-4,4'-diaminodiphenylether or 4-phenoxy-1,3-diaminobenzene of $R_1$ in the general formula (2) may be substituted with another aromatic diamine compound. Examples of the "another aromatic diamine compound" include 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenylether (4,4'-ODA), 3,4'-diaminodiphenylether (3,4'-ODA), 3,3'-diaminodiphenylether, 2-phenyl-3',4-diaminodiphenylether, 2-phenyl-2',4-diaminodiphenylether, 3-phenyl-4,4'-diaminodiphenylether, 3,3'-diaminobenzophenone, 4,4'-diaminobenzophenone, 3,3'-diaminodiphenylmethane, 4,4'-diaminodiphenylmethane, bis(2,6-diethyl-4-aminophenyl)methane, 4,4'-methylene-bis(2,6-diethylaniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, and 9,9-bis(4-(4-aminophenoxy)phenyl)fluorene. These compounds may be used alone or in combination of two or more.

In the imide oligomer in accordance with an embodiment of the present invention, m and n in each of the general formula (1) and the general formula (2) satisfy $1 \le m$, $0 \le n \le 5$, $1 \le m+n \le 10$, and $0.5 \le m/(m+n) \le 1$. $1 \le m \le 5$ may alternatively be satisfied. $0 < n \le 5$ may alternatively be satisfied. $1 < m+n \le 10$ may alternatively be satisfied. $0.5 \le m/(m+n) < 1$ may alternatively be satisfied. For m and n, m+n is preferably not less than 4, and more preferably not less than 5. It is preferable for m and n to satisfy the above inequalities. This is because satisfaction of the inequalities by m and n causes a terminally modified imide oligomer in accordance with an embodiment of the present invention to have even better in-solution storage stability and have high heat resistance and excellent mechanical strength after being cured.

An imide oligomer in accordance with an embodiment of the present invention has a minimum melt viscosity which is preferably not more than 20000 Pa·sec, more preferably not more than 10000 Pa·sec, even more preferably not more than 5000 Pa·sec, and particularly preferably not more than 3000 Pa·sec. An imide oligomer in accordance with an embodiment of the present invention has a minimum melt viscosity which falls within the range of 1 Pa·sec to 20000 Pa·sec. Note, however, that an imide oligomer in accordance with an embodiment of the present invention has a minimum melt viscosity whose range is not particularly limited to the above range. The minimum melt viscosity which falls within the above range is preferable because such a minimum melt viscosity allows an imide oligomer in accordance with an embodiment of the present invention to have excellent moldability. Note that the "minimum melt viscosity" herein refers to that measured by a method described later in the Examples.

An imide oligomer in accordance with an embodiment of the present invention may be obtained by mixing terminally modified imide oligomers having differing molecular weights. A terminally modified imide oligomer in accordance with an embodiment of the present invention may be mixed with another soluble polyimide or thermoplastic polyimide. The thermoplastic polyimide is not particularly limited in, for example, type, and may be any polyimide that softens when heated, specifically, any commercially available polyimide. A semipreg in accordance with an embodiment of the present invention preferably contain substantially no thermoplastic polyimide.

An imide oligomer in accordance with an embodiment of the present invention has a melt viscosity at 280° C. of 200 Pa·sec to 1000000 Pa·sec, more preferably 200 Pa·sec to 800000 Pa·sec, and even more preferably 200 Pa·sec to 500000 Pa·sec. A melt viscosity at 280° C. of more than 1000000 Pa·sec tends to make it difficult for the imide oligomer to flow. Thus, it is difficult for the imide oligomer to be impregnated between fibers during production of a fiber-reinforced composite material. This tends to make it difficult to obtain a fiber-reinforced composite material in which a defect such as a void or an unimpregnated part has been reduced or eliminated. A melt viscosity at 280° C. of less than 200 Pa·sec causes a resin to too easily flow. This tends to make it difficult to produce a semipreg. As a result, it may be difficult to achieve drapeability which a semipreg should have. The "melt viscosity at 280° C." herein refers to that measured by a method described later in the Examples.

A polyimide resin which is obtained by curing an imide oligomer in accordance with an embodiment of the present invention has a 5% weight reduction temperature in air of preferably not lower than 520° C., more preferably not lower than 530° C., and even more preferably not lower than 535° C. A 5% weight reduction temperature in air is considered to be correlated with a rate at which a polyimide resin which is used in a high temperature environment for a long time oxidizes and deteriorates. A polyimide resin which has a higher 5% weight reduction temperature in air can be used in a high temperature environment for a longer time. That is, a polyimide resin which has a higher 5% weight reduction temperature in air can be said to be a material which is highly stably resistant to heat for a long term. The "5% weight reduction temperature in air" herein refers to that measured by a method described later in the Examples.

According to an embodiment of the present invention, examples of reinforcement fibers contained in a semipreg include inorganic fiber such as carbon fiber, glass fiber, metal fiber, ceramic fiber, as well as organic synthetic fiber such as polyamide fiber, polyester-based fiber, polyolefin-based fiber, and novoloid fiber. These types of fiber may be used alone or in combination of two or more.

In particular, in order for a fiber-reinforced composite material produced from the semipreg to have excellent mechanical characteristics and high heat resistance, it is desirable to use carbon fiber as the reinforcement fibers. The carbon fiber is not particularly limited provided that the carbon fiber is a material which (i) has a carbon content in a range of 85 weight % to 100 weight % and (ii) is in the form of continuous fibers whose structure is at least partially a graphite structure. Examples of the carbon fiber include polyacrylonitrile (PAN)-based carbon fiber, rayon-based carbon fiber, lignin-based carbon fiber, and pitch-based carbon fiber. Out of these, PAN-based carbon fiber, pitch-based carbon fiber, and the like are preferable, because such carbon fibers are versatile, inexpensive, and have high strength.

The carbon fiber typically undergoes sizing. Note, however, that it is preferable to use the carbon fiber in which a sizing agent is used in an amount which is as small as possible. Alternatively, it is preferable to remove a sizing agent if necessary by an existing method such as an organic solvent treatment or a heat treatment. The sizing agent is used in an amount of preferably not more than 0.5 wt %, more preferably not more than 0.1 wt %, and even more preferably not more than 0.01 wt %, with respect to the carbon fiber. For carbon fiber, a sizing agent for an epoxy resin is typically used. Thus, the sizing agent may be decomposed at a temperature of not lower than 280° C. at which to cure an imide oligomer in accordance with an embodiment of the present invention. This may adversely affect physical properties of a fiber-reinforced composite material. It is possible to open a fiber bundle in advance by use of, for example, air or a roller, and then impregnate a resin between individual fibers of carbon fiber. The opening of the fiber bundle makes a resin impregnation distance shorter. This makes it easier to obtain a fiber-reinforced composite material in which a defect such as a void has been further reduced or eliminated. In addition, the opening of the fiber bundle allows a semipreg or a prepreg to be more drapeable. This allows the semipreg or the prepreg to be more handleable and more formative.

A form of the reinforcement fibers constituting the semipreg in accordance with an embodiment of the present invention is exemplified by, but not particularly limited to, structures such as unidirectional (UD) materials, textiles (a plain weave, a twill weave, a satin weave, and the like), knitted goods, braided goods, and nonwoven fabrics. The form of the fiber material can be selected as appropriate in accordance with the purpose of use. These forms may be used alone or in combination.

The semipreg in accordance with an embodiment of the present invention has a volatile component which remains in an amount of preferably less than 20 wt %, more preferably less than 10 wt %, even more preferably less than 5 wt %, and particularly preferably less than 1 wt %, with respect to the imide oligomer contained in the semipreg. The volatile component herein mainly contains a solvent used during production of the imide oligomer but also contains a moisture which is desorbed from an amide acid oligomer in which imidization has not proceeded. The volatile component refers to that measured by a method described later in the Examples. The semipreg whose volatile component remains in an amount falling within the above range is preferable. This is because such a semipreg allows a defect (e.g., a void) caused by volatilization and decomposition of, for example, a solvent to be reduced or eliminated in a case where a resin composite material (e.g., a carbon fiber reinforced composite material) is produced by use of the semipreg, so that a favorable composite material can be obtained which has Tg equal to or higher than that of a simple resin.

[2. Method for Producing Semipreg]

An embodiment of the present invention provides a method for producing a semipreg, the method including the step of mixing powders of an imide oligomer with reinforcement fibers in a dry step.

A method in accordance with an embodiment of the present invention for producing a semipreg makes it possible to provide a semipreg in which a residual volatile component has been reduced.

An imide oligomer in accordance with an embodiment of the present invention is not limited to any particular imide oligomer and can be any modified imide oligomer that is used in the present technical field. That is, the imide oligomer in accordance with an embodiment of the present invention can be a terminally modified imide oligomer or does not need to be a terminally modified imide oligomer.

Examples of the imide oligomer in accordance with an embodiment of the present invention include a both-terminal modified imide oligomer, a one-terminal modified imide oligomer, and a side chain modified imide oligomer. These imide oligomers may be used alone or in combination of two or more. According to an embodiment of the present invention, an imide oligomer is preferably an imide oligomer represented by the above general formula (1), and more preferably an imide oligomer represented by the above general formula (2). An imide oligomer which is represented by the above general formula (1) or (2) has an advantage of achieving a fiber-reinforced composite material which has excellent moldability, high heat resistance, and excellent mechanical properties.

Powders of an imide oligomer in accordance with an embodiment of the present invention can be commercially available or can be produced by a method which is typically used in the present technical field.

According to an embodiment of the present invention, examples of a method for producing powders of an imide oligomer include the following steps (1) and (2).

<Step (1)>

According to an embodiment of the present invention, the step (1) is a step of producing varnish containing a terminally modified imide oligomer.

The aromatic tetracarboxylic acid; aromatic diamines including 2-phenyl-4,4'-diaminodiphenylether and 4-phenoxy-1,3-diaminobenzene; and 4-(2-phenylethynyl)phthalic anhydride are used so that a total amount of acid anhydride groups (in the case of mutually adjacent dicarboxylic acid groups, it is considered that there is 1 mol of an acid anhydride group per 2 mol of a carboxyl group) and a total amount of amino groups in all components are substantially equal. The components are polymerized in an organic solvent (described later) at a reaction temperature of not higher than approximately 100° C., particularly not higher than 80° C., so that an amide acid oligomer is produced. The amide acid oligomer is an oligomer having an amide-acid bond and is also known as an amic acid oligomer. Next, the amide acid oligomer is dehydrated and cyclized by a method of adding an imidization agent at a low temperature of approximately 0° C. to 140° C., or by a method of heating the amide acid oligomer to a high temperature of 140° C. to 275° C. This makes it possible to obtain an imide oligomer (terminally modified imide oligomer) having 4-(2-phenylethynyl) phthalic anhydride residue at its terminal(s). As described above, a 1,2,4,5-benzenetetracarboxylic acid (particularly, 1,2,4,5-benzenetetracarboxylic dianhydride) is preferably used as the aromatic tetracarboxylic acid.

The step (1) in accordance with an embodiment of the present invention is particularly preferably carried out by the following method. First, aromatic diamines including 2-phenyl-4,4'-diaminodiphenylether and 4-phenoxy-1,3-diaminobenzene are homogenously dissolved in an organic solvent (described later), and thereafter one or more aromatic tetracarboxylic dianhydrides including 1,2,4,5-benzenetetracarboxylic dianhydride are added to the obtained solution and dissolved homogenously therein so as to obtain a reaction solution. Thereafter, the reaction solution is stirred at a reaction temperature of approximately 5° C. to 60° C. for approximately 1 minute to 180 minutes. Next, 4-(2-phenylethynyl)phthalic anhydride is added to the reaction solution and homogenously dissolved therein. Thereafter, the reaction solution is caused to react while being stirred at a reaction temperature of approximately 5° C. to 60° C. for approximately 1 minute to 180 minutes, so as to produce the above-described terminally modified amide acid oligomer.

Thereafter, the reaction solution is stirred at 140° C. to 275° C. for 5 minutes to 24 hours so as to cause the amide acid oligomer to undergo an imidization reaction. In this way, varnish containing a terminally modified imide oligomer in accordance with an embodiment of the present invention can be obtained. A low imidization rate causes water desorbed from inside a molecule to be a volatile component during forming of a fiber-reinforced composite material. This may cause a defect such as a void or cause decomposition of an oligomer. Thus, the imidization rate is preferably not less than 95%, more preferably not less than 97%, and even more preferably not less than 98%. The imidization rate refers to that measured by a method described later in the Examples. If necessary, a terminally modified imide oligomer in accordance with an embodiment of the present invention may be obtained by cooling the reaction solution to approximately room temperature after the terminally modified amide acid oligomer undergoes the imidization reaction. It is suitable to carry out the reactions in such a manner that some or all of the reaction steps are carried out in an inert gas (such as nitrogen gas or argon gas) atmosphere or in a vacuum.

Examples of the organic solvent include N-methyl-2-pyrrolidone (NMP), N,N-dimethylacetamide (DMAc), N,N-diethylacetamide, N-methylcaprolactam, γ-butyrolactone (GBL), and cyclohexanone. These solvents may be used alone or in combination of two or more. In selecting these solvents, it is possible to apply known techniques regarding soluble polyimides.

<Step (2)>

According to an embodiment of the present invention, the step (2) is a step of producing terminally modified imide oligomer powders from varnish containing a terminally modified imide oligomer.

In the present step (2), the varnish obtained in the step (1) and containing the terminally modified imide oligomer is poured into water, a poor solvent such as methanol, or a nonsolvent, and thereafter the terminally modified imide oligomer is isolated in a form of a powdery product. In this way, terminally modified imide oligomer powders can be produced.

Alternatively, according to another embodiment of the present invention, imide oligomer powders can be produced by a so-called "high-temperature melt synthesis method" or "high-temperature solid-phase synthesis method" described in "*Saishin poriimido-Kiso to Ôyô*- [Basic and applied latest polyimide] compiled by Japan Polyimide Research Group; edited and written by Yoshio Imai and Rikio Yokota, NTS Inc., pp. 20-26 (2002)". It is suitable to produce imide oligomer powders by a high-temperature melt synthesis method or a high-temperature solid-phase synthesis method. This is because of the following reason. Specifically, in such a synthesis method, no solvent is used to polymerize a terminally modified imide oligomer, and no volatile component is used to isolate a terminally modified imide oligomer, so that an amount of a volatile component which is brought into an imide oligomer can be made as small as possible.

The terminally modified imide oligomer powders obtained by the above-described method can be used in the following dry step.

A method in accordance with an embodiment of the present invention for producing a semipreg includes a step of mixing powders of an imide oligomer and reinforcement fibers in a dry step.

The "dry step" herein means a step of mixing powders of an imide oligomer and reinforcement fibers without using any volatile component such as a solvent or a dispersion medium. According to a conventional method, a prepreg is produced by impregnating, into reinforcement fibers, varnish containing a terminally modified imide oligomer (i.e., solution composition of a terminally modified imide oligomer). This causes a problem such that a volatile component such as a solvent remains in an obtained prepreg. There is also an example in which a reduction in residual volatile component is attempted by drying a prepreg in which a volatile component such as a solvent remains. Note, however, that a step of evaporating, in a state of a prepreg, a volatile component such as a solvent is not preferable because such a step imposes a heavy load on production and/or equipment. According to an embodiment of the present invention, a semipreg is produced in the dry step in which a volatile component such as a solvent or a dispersion medium is not used. Thus, it is possible to obtain a semipreg in which a residual volatile component has been reduced. This is an effect which is more advantageous than that brought about by the conventional technique.

An embodiment of the present invention is not particularly limited provided that imide oligomer powders and reinforcement fibers are mixed in the dry step. For example, imide oligomer powders are adhered to reinforcement fibers by placing the imide oligomer powders on the reinforcement fibers, spraying the imide oligomer powders on the reinforcement fibers, or letting the reinforcement fibers through a vessel which contains the imide oligomer powders. Thereafter, the imide oligomer powders may be melted by use of, for example, a heating roller such as a nip roller, a pressing machine, a laminator machine, an IR heater, a laser, a gas torch, or an ultrasonic torch. Alternatively, after being melted, the imide oligomer powders may be impregnated into the reinforcement fibers by applying thereto a pressure. Production of a semipreg does not necessarily require application of a pressure.

The "dry step" herein may be carried out, by opening a fiber bundle in advance by use of, for example, air or a roller, so that a resin is impregnated between individual fibers of carbon fiber. The opening of the fiber bundle makes a resin impregnation distance shorter. This makes it easier to obtain a fiber-reinforced composite material in which a defect such as a void has been further reduced or eliminated. In addition to this, a semipreg or a prepreg is made more drapeable. This allows the semipreg or the prepreg to be more handleable and more formative.

According to an embodiment of the present invention, a hot press, a vacuum hot press, or the like is used as a pressing machine. For example, a semipreg can be obtained by being heated and melted at a temperature of 230° C. to 370° C. and a pressure of 0.1 MPa to 20 MPa for 0.1 minutes to 10 minutes. Note that values of pressure herein all refer to values of actual pressure applied to samples.

Note that reinforcement fibers in accordance with an embodiment of the present invention are similar to those described earlier in [1. Semipreg].

Imide oligomer powders used in an embodiment of the present invention are not limited to any particular imide oligomer powders. Note, however, that the imide oligomer powders used in an embodiment of the present invention have an average particle size of preferably 1 μm to 1000 μm, more preferably 10 μm to 500 μm, and even more preferably 10 μm to 300 μm. Note also that an entire particle size distribution preferably falls within the range of 1 μm to 1000 μm. The imide oligomer powders which have an average particle size of less than 1 μm may form many fine powders while being adhered to the reinforcement fibers in the dry step. This may cause a deterioration in workability. The imide oligomer powders which have an average particle size of more than 1000 µm may cause the reinforcement fibers to flow together with the imide oligomer powders which are being heated and melted so as to be impregnated or fused into the reinforcement fibers. This may break an alignment of the reinforcement fibers or cause great unevenness in adhesion of the imide oligomer to the reinforcement fibers. Note that the "average particle size" and the "particle size distribution" herein refer to those measured by methods described later in the Examples.

Powders of an imide oligomer can be obtained by a known method. For example, a pulverization method carried out by use of, for example, a hammer mill, a jet mill, a ball mill, or a beads mill may be employed. Alternatively, frost shattering may be carried out. If necessary, classification may be carried out by use of, for example, a vibrating sieve or a rotary air jet sieve.

[3. Prepreg]

An embodiment of the present invention provides a prepreg obtained from the semipreg described earlier.

The term "prepreg" herein means a resin-reinforcement fiber composite in which a resin (e.g., an imide oligomer) is impregnated into reinforcement fibers so that the resin is integral with the reinforcement fibers. A "prepreg" is higher than a "semipreg" in degree of impregnation of a resin into reinforcement fibers. Thus, a "prepreg" is frequently less drapeable than a "semipreg". Note, however, that a laminate is generally formed in a shorter time by use of a prepreg, in which a resin is impregnated between fibers in advance, than by use of a semipreg. A prepreg thus has an advantage of being used by selecting a less strict condition. For example, in a case where a prepreg is used, a laminate can be formed under a low pressure.

A prepreg in accordance with an embodiment of the present invention is produced from a semipreg produced by mixing powders of an imide oligomer and reinforcement fibers without using any volatile component such as a solvent or a dispersion medium. This makes it possible to provide a prepreg which has a lower residual volatile component content. Furthermore, a resin composite material produced by use of such a prepreg (e.g., a carbon fiber reinforced composite material) brings about an extremely advantageous effect such that a defect (e.g., a void) caused by volatilization and decomposition of, for example, a solvent is reduced or eliminated, so that the resin composite material has a Tg equal to or higher than that of a simple resin.

According to an embodiment of the present invention, a method for producing a prepreg is not particularly limited to any specific method provided that the method is a method for producing a prepreg by using, as a starting material, a semipreg in accordance with an embodiment of the present invention. The method for producing a prepreg can be carried out so as continue from production of a semipreg. Depending on a process, a boundary between production of a semipreg and production of a prepreg may be unclear.

A semipreg or a prepreg contains an imide oligomer in an amount which is not limited to any particular amount but is normally 15 wt % to 90 wt %, and preferably 20 wt % to 70 wt %, in a case where a volatile component weight is excluded from the weight of semipreg or the prepreg, i.e., in a case where the semipreg or the prepreg consists only of reinforcement fibers and the imide oligomer.

According to an embodiment of the present invention, a method for producing a prepreg is preferably a method including a step of heating and melting the semipreg (described earlier) so as to impregnate an imide oligomer into reinforcement fibers.

According to an embodiment of the present invention, the semipreg is heated and melted at, for example, not lower than 250° C., and preferably not lower than 270° C. The semipreg is heated and melted for, for example, 0.1 minutes to 20 minutes, and more preferably 1 minute to 20 minutes. By heating and melting the semipreg in accordance with an embodiment of the present invention under the above conditions, an imide oligomer can be impregnated into reinforcement fibers.

According to an embodiment of the present invention, a method for producing a prepreg can include a cooling and solidification step after heating and melting the semipreg. The cooling and solidification step is a step of changing, into a matrix resin, an imide oligomer which has been impregnated into reinforcement fibers. The cooling and solidification step is carried out at, for example, not higher than 150° C., and preferably not higher than 100° C.

A prepreg produced in an embodiment of the present invention can be used to produce a resin composite material (described later).

[4. Resin Composite Material]

A resin composite material in accordance with an embodiment of the present invention may be obtained by layering and then heat-curing the prepreg, or may be obtained by layering and then heat-curing the semipreg. A resin composite material which is obtained by layering and heat-curing a semipreg is, specifically, a resin composite material which is obtained without the need to take out a prepreg, which is an intermediate. Alternatively, a resin composite material in accordance with an embodiment of the present invention may be obtained by layering and then heat-curing a combination of a prepreg and a semipreg. In order to achieve a simplified production process, it is preferable to produce a resin composite material by heating a semipreg in a mold first so as to obtain a prepreg, and then continuously heating the obtained prepreg in that mold. In the following description, a resin composite material may also be referred to as a "fiber-reinforced composite material". A resin composite material in accordance with an embodiment of the present invention can be obtained, for example, in the following manner.

A fiber-reinforced composite material can be obtained by layering the prepreg in a predetermined number of layers and then using an autoclave, a (vacuum) hot press, or the like to heat-cure the prepreg at a temperature of 280° C. to 500° C. and a pressure of 0.1 MPa to 100 MPa for approximately 10 minutes to 40 hours. Alternatively, instead of using the prepreg, a fiber-reinforced composite material can be obtained in a form of a laminate produced by layering and then heat-curing the semipreg in the manner described earlier.

In producing a resin composite material in an embodiment of the present invention, a step of producing a semipreg or a prepreg by adhering powders of an imide oligomer to reinforcement fibers first and then carrying out heating is provided as a more specific condition for molding. This step is also referred to as a step (a). Subsequently, it is desirable to provide a step of obtaining a stack by layering the semipreg or the prepreg obtained in the step (a), and then maintaining the stack at 260° C. to 320° C. and 0.1 MPa to 20 MPa for 5 minutes to 300 minutes. This step is also referred to as a step (b). This makes it possible to (i) impregnate the imide oligomer into the reinforcement fibers and (ii) promote interlayer adhesion of the semipreg and/or the prepreg. A time for which the stack is maintained is not limited to any particular time provided that the time falls within the above range. Note, however, that the time is preferably 10 minutes to 200 minutes, more preferably 15 minutes to 150 minutes, and particularly preferably 20 minutes to 120 minutes. The time which is shorter than 5 minutes may cause the imide oligomer to be insufficiently impregnated into the reinforcement fibers. In contrast, the time which is longer than 300 minutes may cause the imide oligomer and/or the reinforcement fibers to deteriorate by an oxidation reaction or heat. In addition, the time which is longer than 300 minutes makes a time for molding longer. This is insufficient. A temperature at which the stack is maintained is not limited to any particular temperature provided that the temperature falls within the above range. Note, however, that the temperature is preferably 270° C. to 310° C., and more preferably 280° C. to 310° C. The temperature which is lower than 260° C. may cause the imide oligomer to be insufficiently impregnated into the reinforcement fibers due to a high melt viscosity of the imide oligomer. The temperature which is higher than 320° C. causes a curing reaction of the imide oligomer to proceed, so that the imide oligomer has a higher melt viscosity. This may cause the imide oligomer to be insufficiently impregnated into the reinforcement fibers. A pressure at which the stack is maintained is not limited to any particular pressure provided that the pressure falls within the above range. Note, however, that the pressure is preferably 0.1 MPa to 15 MPa, more preferably 0.1 MPa to 10 MPa, and particularly preferably 0.5 MPa to 10 MPa. The pressure which is less than 0.1 MPa may cause the imide oligomer to be insufficiently impregnated into the reinforcement fibers. The pressure which is more than 20 MPa may cause the imide oligomer to protrude out of the reinforcement fibers. This may make it impossible to obtain a desired fiber-reinforced composite material. Furthermore, the pressure which is more than 20 MPa is uneconomical because such a pressure requires large-scale equipment in producing a large-sized molded product. The temperature and the pressure may be changed, while the stack is being maintained, so as to fall within the respective above ranges. Alternatively, while the stack is being maintained, there may be a time for which heating is carried out at a predetermined temperature without pressure application.

By providing the step (b), it is possible to reduce a defect such as a void. During pressure application, it is possible to add a step of repeating pressure application and pressure reduction several times so as to remove, for example, an air bubble which remains in the fiber-reinforced composite material. In a case where this step is added, an internal defect (e.g., a void) in the fiber-reinforced composite material may be further reduced. This step may be referred to as, for example, pumping.

Thereafter, it is desirable to provide a step of further maintaining, at 330° C. to 500° C. and 0.1 MPa to 20 MPa for 15 minutes to 120 minutes, the stack which has undergone the step (b). This step is also referred to as a step (c). This makes it possible to obtain an excellent resin composite material. A time for which the stack is maintained is not limited to any particular time provided that the time falls within the above range. Note, however, that the time is preferably 20 minutes to 120 minutes, and particularly preferably 30 minutes to 90 minutes. The time which is shorter than 15 minutes may cause a curing reaction to less sufficiently proceed. In contrast, the time which is longer than 120 minutes may cause the resin and/or the reinforcement fibers to deteriorate due to oxidation or heat. A temperature at which the stack is maintained is not limited to any particular temperature provided that the temperature falls within the above range. Note, however, that the temperature is preferably 350° C. to 450° C., and more preferably 360° C. to 400° C. The temperature which is lower than 330° C. may cause a curing reaction to less sufficiently proceed. In contrast, the temperature which is higher than 500° C. may cause the resin to deteriorate due to an oxidation reaction or heat. A pressure at which the stack is maintained is not limited to any particular pressure provided that the pressure falls within the above range. Note, however, that the pressure is preferably 0.1 MPa to 15 MPa, more preferably 0.1 MPa to 10 MPa, and particularly preferably 0.5 MPa to 10 MPa.

Before the step (a), it is possible to provide a step of opening a fiber bundle of the reinforcement fibers. The imide oligomer is preferably an imide oligomer represented by the general formula (1) (described earlier). In producing a prepreg after producing a semipreg, a heating time during production of the semipreg is preferably shorter than a heating time during production of the prepreg.

All these steps may be carried out in a vacuum or in an inert gas, or may be carried out in the atmosphere.

A resin composite material in accordance with an embodiment of the present invention has a glass transition temperature (Tg) of preferably not lower than 320° C., and not lower than 350° C. The glass transition temperature which falls within the above range causes the resin composite material in accordance with an embodiment of the present invention to have higher heat resistance. Note that the "glass transition temperature" herein refers to that measured by a method described later in the Examples.

A fiber-reinforced composite material structure may be obtained by inserting, between (a) the fiber-reinforced composite material and (b) a material of a different kind or an identical kind, the imide oligomer molded into film form, imide oligomer powders, or the semipreg or the prepreg, and then heating and melting the imide oligomer, the imide oligomer powders, or the semipreg or the prepreg so as to produce an integrated structure. The material of a different kind is not particularly limited and can be any material ordinarily used in the present field. Examples of the material of a different kind include a metal material having, for example, a honeycomb-like shape, and a core material having, for example, a sponge-like shape.

[5. Uses]

The semipreg, the prepreg, the resin composite material, and the like can be used in a wide range of fields requiring easy moldability and high heat resistance, including the fields of aircraft and space industry devices, vehicle engine (peripheral) members, and general industrial uses such as a transfer arm, a robot arm, and slidable members (e.g., a roll material, a friction member, and a bearing). Examples of an aircraft member include a fan case of an engine, an inner frame of the engine, a rotor blade (e.g., a fan blade) of the engine, a stationary blade (structure guide vane (SGV)) of the engine, a bypass duct of the engine, and various pipes of the engine. Preferable examples of a vehicle member include brake members, engine members (e.g., a cylinder, a motor case, and an air box), and energy regeneration system members.

The present invention is not limited to the embodiments, but can be altered by a skilled person in the art within the scope of the claims. The present invention also encompasses, in its technical scope, any embodiment derived by combining technical means disclosed in differing embodiments.

Aspects of the present invention can also be arranged as follows:

[1] A semipreg containing: powders of an imide oligomer; and reinforcement fibers, the imide oligomer being represented by the following general formula (1):

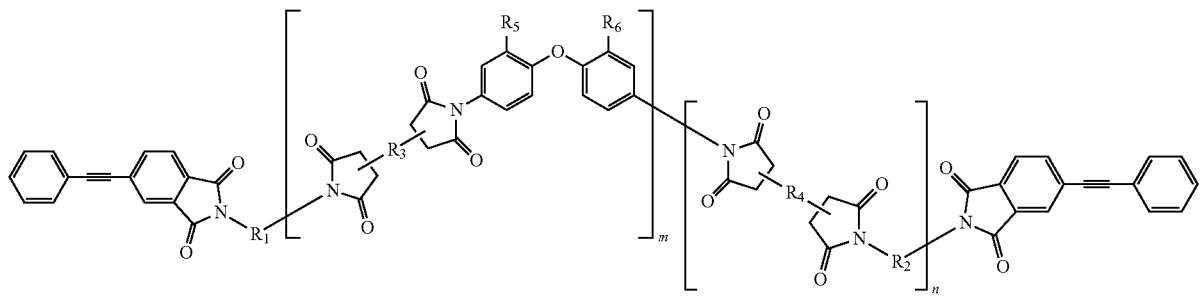

wherein $R_1$ represents a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_2$ represents a divalent residue of at least one aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_3$ and $R_4$, which are identical or different, each represent a tetravalent residue of an aromatic tetracarboxylic acid;

one of $R_5$ and $R_6$ represents a phenyl group, and the other one of $R_5$ and $R_6$ represents a hydrogen atom;

m and n satisfy the following:
$1 \leq m$,
$0 \leq n \leq 5$,
$1 \leq m+n \leq 10$, and
$0.5 \leq m/(m+n) \leq 1$; and a sequence of repeating units may be a block sequence or a random sequence.

[2] The semipreg recited in [1], wherein the imide oligomer is represented by the following general formula (2):

$R_4$ and $R_5$, which are identical or different, each represent a tetravalent residue of an aromatic tetracarboxylic acid;

one of $R_6$ and $R_7$ represents a phenyl group, and the other one of $R_6$ and $R_7$ represents a hydrogen atom;

m and n satisfy the following:
$1 \leq m$,
$0 \leq n \leq 5$,
$1 \leq m+n \leq 10$, and
$0.5 \leq m/(m+n) \leq 1$; and a sequence of repeating units may be a block sequence or a random sequence.

[3] The semipreg recited in [1] or [2], wherein a volatile component remains in an amount of less than 20 wt % with respect to the imide oligomer.

[4] The semipreg recited in any one of [1] through [3], wherein m+n is not less than 4 in the imide oligomer.

[5] The semipreg recited in any one of [1] through [4], wherein the imide oligomer has a minimum melt viscosity of 1 Pa·sec to 20000 Pa·sec.

[6] The semipreg as set forth in any one of [1] through [5], wherein the imide oligomer has a melt viscosity at 280° C. of 200 Pa·sec to 1000000 Pa·sec.

[7] The semipreg as set forth in any one of [1] through [6], wherein a polyimide resin which is obtained by curing the imide oligomer has a 5% weight reduction temperature in air of not lower than 520° C.

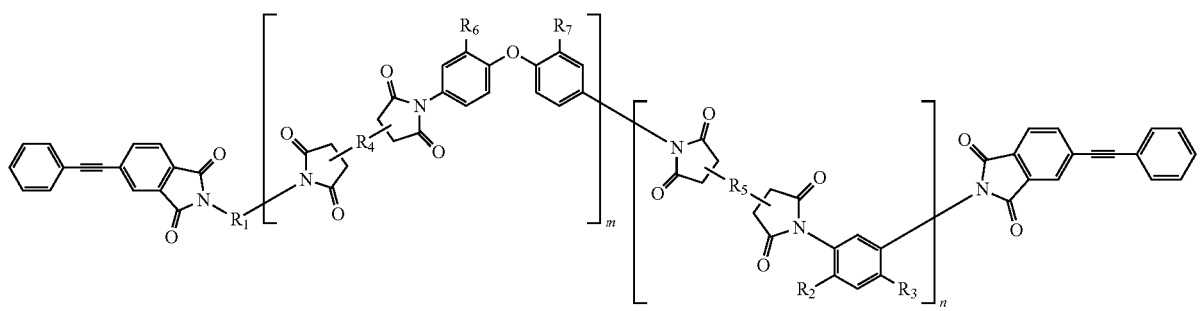

wherein $R_1$ represents a divalent residue of an aromatic diamine selected from 2-phenyl-4,4'-diaminodiphenylether and 4-phenoxy-1,3-diaminobenzene;

one of $R_2$ and $R_3$ represents a phenoxy group, and the other one of $R_2$ and $R_3$ represents a hydrogen atom;

[8] A prepreg obtained from a semipreg recited in any one of [1] through [7].

[9] A resin composite material obtained by heat-curing a prepreg recited in [8].

[10] A method for producing a semipreg, including the step of mixing powders of an imide oligomer with reinforcement fibers in a dry step.

[11] The method recited in [10], wherein the imide oligomer has a terminal capped with 4-phenylethynyl phthalic anhydride.

[12] A method for producing a prepreg, including the step of heating and melting a semipreg, obtained by a method recited in [10] or [11], so as to impregnate an imide oligomer into reinforcement fibers.

[13] A method for producing a resin composite material, including the step of layering and then heat-curing a prepreg obtained by a method recited in [12].

[14] A method for producing a resin composite material, including the steps of:

(a) producing a semipreg or a prepreg by adhering powders of an imide oligomer to reinforcement fibers and then carrying out heating;

(b) obtaining a stack by layering the semipreg or the prepreg obtained in the step (a), and then maintaining the stack at 260° C. to 320° C. and 0.1 MPa to 20 MPa for 5 minutes to 300 minutes; and (c) further maintaining, at 330° C. to 500° C. and 0.1 MPa to 20 MPa for 15 minutes to 120 minutes, the stack which has undergone the step (b).

[15] The method recited in [14], further including, before the step (a), the step of opening a fiber bundle of the reinforcement fibers.

[16] The method recited in [14] or [15], wherein the imide oligomer is represented by the following general formula (1):

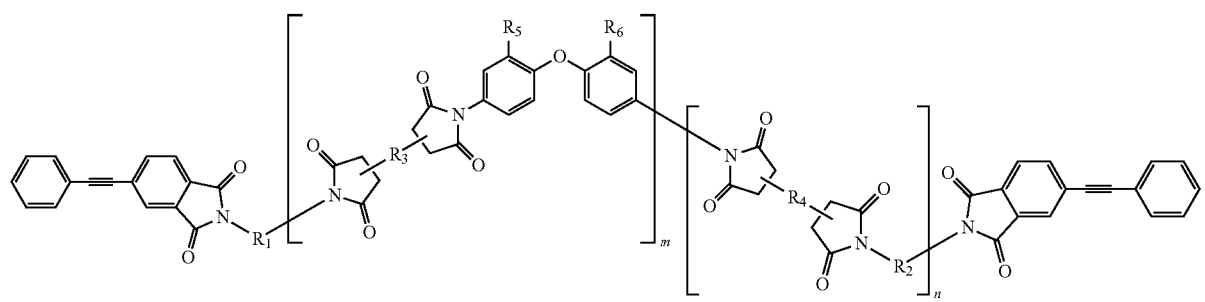

(1)

wherein $R_1$ represents a divalent residue of at least one aromatic diamine selected from 2-phenyl-4,4'-diaminodiphenylether, 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_2$ represents a divalent residue of at least one aromatic diamine selected from 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_3$ and $R_4$, which are identical or different, each represent a tetravalent residue of an aromatic tetracarboxylic acid;

one of $R_5$ and $R_6$ represents a phenyl group, and the other one of $R_5$ and $R_6$ represents a hydrogen atom;

m and n satisfy the following:
$1 \leq m$,
$0 \leq n \leq 5$,
$1 \leq m+n \leq 10$, and
$0.5 \leq m/(m+n) \leq 1$; and a sequence of repeating units may be a block sequence or a random sequence.

The inventors of the present invention carried out diligent study so as to solve the problems of Patent Literatures 1 and 2 such that (i) it is necessary to use special powders (an imide oligomer having a low degree of polymerization or a mixture of an imide oligomer having a low degree of polymerization and a thermoplastic polyimide) and (ii) a cured product has low heat resistance (5% weight reduction temperature and/or glass transition temperature). As a result, the inventors found the following. Specifically, also in a case where an imide oligomer having a relatively high degree of polymerization, a semipreg, a prepreg, and a resin composite material each of which has high heat resistance and allows a reduction in residual volatile component can be obtained by, for example, carrying out the following measures:

a measure to use an imide oligomer having a specific structure;

a measure to improve formativity by heating a mixture of reinforcement fibers and powders of an imide oligomer for a short time first so as to produce a semipreg and layering the semipreg which is thus highly drapeable, and thereafter heating, on a full-scale, a stack in which the semipreg is layered, and impregnating a resin into the reinforcement fibers;

a measure to obtain a resin composite material fewer in defect (e.g., void) by promoting impregnation of an imide oligomer into reinforcement fibers and interlayer adhesion of a semipreg and/or a prepreg by setting, in a step of obtaining the resin composite material by hot-pressing a stack in which the semipreg and/or the prepreg are/is layered, a heating temperature, a pressure, and a time in respective suitable ranges; and a measure to achieve a shorter distance between powders in a semipreg and higher drapeability by using reinforcement fibers opened during production of the semipreg or a prepreg.

EXAMPLES

Examples and Comparative Examples of the present invention will be described below. Note, however, that the present invention is not limited by the following. In the present Examples, values of pressure all refer to values of actual pressure applied to samples, but not values of pressure indicated by, for example, a pressing machine.

[Test Methods]

(1) Measurement of Glass Transition Temperature (Tg) (Film-Like Resin)

Measurements were carried out with use of a dynamic viscoelastic behavior measurement (DMA) apparatus (RSA-II, manufactured by Rheometric). The measurements were carried out at a temperature increase rate of 5° C./min and a frequency of 1 Hz. The glass transition temperature was considered to be the point of intersection of (i) a line tangent to a storage modulus of elasticity curve before a fall in the storage modulus of elasticity curve and (ii) a line tangent to the storage modulus of elasticity curve after the fall in the storage modulus of elasticity curve.

(Fiber-Reinforced Composite Material)

A central part of a fiber-reinforced composite material plate was cut so that test pieces were produced. Then, measurements were carried out with use of a dynamic viscoelastic behavior measurement (DMA) apparatus (DMA-Q-800, manufactured by TA Instruments), by a single cantilever method, with 0.1% strain, at a frequency of 1 Hz, and at a temperature increase rate of 5° C./min. The glass transition temperature was considered to be the point of intersection of (i) a line tangent to a storage modulus of elasticity curve before a fall in the storage modulus of elasticity curve and (ii) a line tangent to the storage modulus of elasticity curve after the fall in the storage modulus of elasticity curve.

(2) Measurements of Minimum Melt Viscosity and Melt Viscosity at 280° C.

Measurements were carried out with use of a rheometer (DISCOVERY HR-2, manufactured by TA Instruments) with 25 mm parallel plates and at a temperature increase rate of 5° C./min. Note that the "minimum melt viscosity" means a minimum value of melt viscosity measured under the above conditions.

(3) Observation of Cross Section

A central part of a fiber-reinforced composite material plate was cut. The cut central part was embedded in an epoxy resin (EpoHold R, 2332-32R/EpoHold H, 2332-8H, manufactured by SANKEI Co., Ltd.), and then the epoxy resin was cured. A surface of the epoxy resin was polished with use of Mecatech 334 manufactured by PRESI, so that observation samples were produced. Observation of cross sections of fiber-reinforced composite materials (observation samples) was carried out with use of an optical microscope (Axioplan2 Imaging, manufactured by Carl Zeiss Microscopy, or VHX-5000, manufactured by Keyence Corporation).

(4) Measurement of Residual NMP

Approximately 20 mg/mL of a DMF solution containing terminally modified imide oligomer powders was prepared, and quantification was carried out by GC/MS analysis (GC: 6890N, manufactured by Agilent technologies, MS: 5973N, manufactured by Agilent technologies, column: SUPELCO-WAX 0.25 mm ID×30 m).

(5) Measurement of Imidization Rate

A peak area was measured at 30° C. by dissolving terminally modified imide oligomer powders in deuterated DMF (deuterated N,N-dimethylacetamide) and using a proton nuclear magnetic resonance spectroscopic device (model: AV-400M, manufactured by Bruker Japan K.K., $^1$H-NMR). An imidization rate was calculated from (i) a peak area whose chemical shift is 7 ppm to 9 ppm and which is derived from aromatic $^1$H and (ii) a peak area whose chemical shift is around 11 ppm and which is derived from a residual amide.

(6) Measurements of Volatile Component Content, Carbon Fiber Content, and Terminally Modified Imide Oligomer Content A predetermined amount of a produced prepreg was measured. Then, a volatile component was removed by leaving the prepreg to stand in an oven at 280° C. for 1 hour. Thereafter, a volatile component content was found by measuring the weight of the prepreg again. A resin component was washed off by washing the produced prepreg with NMP. Subsequently, the prepreg was dried, and then a carbon fiber content was found by measuring the weight of the prepreg. A terminally modified imide oligomer content was found by deducting the volatile component weight and the carbon fiber weight from the total weight.

(7) Measurement of Particle Size Distribution of Terminally Modified Imide Oligomer Terminal imide oligomer powders were redispersed in isopropyl alcohol, and a volume average particle size distribution was measured with use of a laser diffraction particle size distribution measuring device (Mastersizer, manufactured by Malvern). A 50% cumulative volume average particle size was considered to be an average particle size.

(8) Measurement of 5% Weight Reduction Temperature in Air A 5% weight reduction temperature was measured with use of a thermogravimetric analysis (TGA) apparatus (EXSTAR TG/DTA6300, manufactured by Seiko Instruments), in an atmospheric environment, and at a temperature increase rate of 5° C./min.

Production Example 1

To a 300 mL three-necked flask having a thermometer and a stirrer, 23.43 g (84.8 mmol) of 2-phenyl-4,4'-diaminodiphenylether and 82.5 g of N-methyl-2-pyrrolidone (NMP) were added. After the 2-phenyl-4,4'-diaminodiphenylether was dissolved, 3.28 g (9.41 mmol) of 9,9-bis(4-aminophenyl)fluorene was added to the flask and stirred until dissolved. Next, 16.44 g (75.4 mmol) of 1,2,4,5-benzenetetracarboxylic dianhydride was added to the flask. Nitrogen was then filled into and sealed in the flask, and a polymerization reaction was allowed to take place at room temperature for 1.5 hours so that an amide acid oligomer was produced. To the reaction solution containing the amide acid oligomer, 9.35 g (37.7 mmol) of 4-(2-phenylethynyl)phthalic anhydride (PEPA) and 15 g of NMP were added. Then, nitrogen was filled into and sealed in the flask, and a reaction was allowed to take place at room temperature for 1.5 hours so that the amide acid oligomer was terminally modified. Thereafter, a nitrogen introduction tube was attached to the flask, and stirring was carried out under flow of a nitrogen gas stream for 5 hours at 200° C. so that imide bonds were formed and cooling was carried out. Thus, a terminally modified imide oligomer NMP solution (varnish) (N1) was obtained.

Production Example 2

The terminally modified imide oligomer NMP solution (varnish) (N1) obtained in Production Example 1 was diluted to 15 weight % and then introduced into 3300 mL of ion exchange water. A solid content which precipitated was separated by filtering. The solid content obtained through the filtering was washed for 30 minutes with 1000 mL of methanol and then dried under reduced pressure for 14 hours at 200° C., so that a granular terminally modified imide oligomer was obtained. Thereafter, the granular terminally modified imide oligomer was pulverized with use of a hammer mill, so that terminally modified imide oligomer powders (P1) having an average volume particle size of 61 µm were obtained.

The terminally modified imide oligomer was composed such that, in the above general formula (1), $R_1$ was represented by a 2-phenyl-4,4'-diaminodiphenylether residue or a 9,9-bis(4-aminophenyl)fluorene residue, $R_2$ was represented by a 9,9-bis(4-aminophenyl)fluorene residue, $R_3$ and $R_4$ were each represented by a 1,2,4,5-benzenetetracarboxylic dianhydride residue, and, on average, m=3.6 and n=0.4.

Residual NMP of the terminally modified imide oligomer powders (P1) was analyzed with use of GC/MS. As a result, 790 ppm of NMP remained. Furthermore, an imidization rate measured with use of $^1$H-NMR was 98.5%. Moreover, the terminally modified imide oligomer powders (P1) were able to be dissolved, into an NMP solvent which was at room temperature, so as to achieve a concentration of not less than 35 weight %. A 35 wt/n % NMP solution (varnish) remained stable, without exhibiting gelation or the like, after being left to stand at room temperature for 1 month. The terminally modified imide oligomer powders (P1) which had not been cured had a minimum melt viscosity of 193 Pa·sec (348° C.) and a melt viscosity at 280° C. of approximately 30000 Pa·sec. A film-like cured product (thickness: 90 μm) was obtained by heating the terminally modified imide oligomer in powder form with use of a hot press for 1 hour at 370° C. The film-like cured product was used to be subjected to measurement of Tg with use of DMA, and the Tg was 368° C. Furthermore, the film-like cured product was subjected to measurement of a 5% weight reduction temperature in air, and the 5% weight reduction temperature in air was 537° C.

Production Example 3

To a 300 mL three-necked flask having a thermometer and a stirrer, 100 g of NMP, 13.3 g (45.2 mmol) of 2,3,3',4'-biphenyltetracarboxylic dianhydride, and 19.75 g (79.5 mmol) of PEPA were added under a nitrogen temperature and dissolved. Next, 12.4 g (42.4 mmol) of 1,3-bis(4-aminophenoxy)benzene and 4.55 g (42.1 mmol) of m-phenylene diamine were added so that an amide acid oligomer was obtained. Thereafter, a nitrogen introduction tube was attached to the flask, and stirring was carried out under flow of a nitrogen gas stream for 5 hours at 200° C. so that imide bonds were formed and cooling was carried out. Thus, a terminally modified imide oligomer NMP solution (varnish) (N2) was obtained.

Production Example 4

The terminally modified imide oligomer NMP solution (varnish) (N2) obtained in Production Example 3 was introduced into 1.5 kg of ion exchange water having a normal temperature. A solid content which precipitated was separated by filtering. The solid content obtained through the filtering was washed 3 times with 1.5 kg of ion exchange water and then dried under reduced pressure for 14 hours at 120° C., so that a granular terminally modified imide oligomer was obtained. The granular terminally modified imide oligomer was crushed in a mortar, so that terminally modified imide oligomer powders (P2) were obtained.

Production Example 5

Production Example 5 obtained a terminally modified imide oligomer NMP solution (varnish) (N3) as in the case of Production Example 1 except that:

Production Example 5 changed an amount of use of 2-phenyl-4,4'-diaminodiphenylether from 23.43 g (84.8 mmol) to 24.12 g (87.3 mmol);

Production Example 5 changed an amount of use of 9,9-bis(4-aminophenyl)fluorene from 3.28 g (9.41 mmol) to 3.38 g (9.70 mmol);

Production Example 5 changed an amount of use of 1,2,4,5-benzenetetracarboxylic dianhydride from 16.44 g (75.4 mmol) to 18.13 g (83.1 mmol); and Production Example 5 changed an amount of use of PEPA from 9.35 g (37.7 mmol) to 6.88 g (27.7 mmol).

Production Example 6

The terminally modified imide oligomer NMP solution (varnish) (N3) obtained in Production Example 5 was diluted to 15 weight % and then introduced into 3300 mL of ion exchange water. A solid content which precipitated was separated by filtering. The solid content obtained through the filtering was washed for 30 minutes with 1000 mL of methanol and then dried under reduced pressure for 24 hours at 220° C., so that a granular terminally modified imide oligomer was obtained. Thereafter, the granular terminally modified imide oligomer was pulverized with use of a frozen hammer mill, so that terminally modified imide oligomer powders (P3) having an average volume particle size of 25 μm were obtained.

The terminally modified imide oligomer was composed such that, in the above general formula (1), $R_1$ was represented by a 2-phenyl-4,4'-diaminodiphenylether residue or a 9,9-bis(4-aminophenyl)fluorene residue, $R_2$ was represented by a 9,9-bis(4-aminophenyl)fluorene residue, $R_3$ and $R_4$ were each represented by a 1,2,4,5-benzenetetracarboxylic dianhydride residue, and, on average, m=5.4 and n=0.6.

The terminally modified imide oligomer powders (P3) had a minimum melt viscosity of 3110 Pa·sec (357° C.) and a melt viscosity at 280° C. of approximately 150000 Pa·sec. A film-like cured product (thickness: 85 μm) was obtained by heating the terminally modified imide oligomer in powder form with use of a hot press for 1 hour at 370° C. The film-like cured product was used to be subjected to measurement of Tg with use of DMA, and the Tg was 369° C. Furthermore, the film-like cured product was subjected to measurement of a 5% weight reduction temperature in air, and the 5% weight reduction temperature in air was 540° C.

Example 1

On plain-woven carbon fiber material ("TORAYCA cloth CO6343", manufactured by Toray Industries, Inc., fiber mass per unit area: 198 g/m$^2$), which had been cut so as to have a size of 12 cm×12 cm and had been priorly subjected to de-sizing, 1.70 g of the terminally modified imide oligomer powders (P1) obtained in Production Example 2 were placed so as to be homogenously dispersed. The terminally modified imide oligomer powders (P1) thus placed on the plain-woven carbon fiber material were sandwiched by release polyimide films and further sandwiched by 20 cm×20 cm stainless steel plates, so that a stack was obtained. Then, the stack was heated at 310° C. for 1 minute under a slight pressure with use of a pressing machine (MINI TEST PRESS-10, manufactured by Toyo Seiki Seisaku-sho, Ltd.). Thereafter, the stack was pressed at 310° C. for 1 minute while a pressure of 5 MPa was applied thereto. A semipreg (D1) was thus obtained. The semipreg (D1), which was planar, was clearly more flexible than a prepreg obtained from similar reinforcement fibers and a similar resin.

By a method similar to the above method, 16 semipregs were produced. A fiber weight content estimated from the plain-woven carbon fiber material weight obtained before the semipregs had been produced and the semipreg weight obtained after the semipregs had been produced was 61 wt % on average. Assuming that a carbon fiber density was 1.8 g/cm$^3$ and a terminally modified imide oligomer density was 1.3 g/cm$^3$, a fiber volume content (Vf) was estimated at 53%.

The semipregs were each cut so as to have a size of 10 cm×10 cm, and 20 semipregs were layered. The stack was wrapped in a release polyimide film and placed on a 45 cm×45 cm stainless steel plate. Then, the stack thus wrapped was heated to 300° C. with use of a vacuum hot pressing machine (manufactured by KITAGAWA SEIKI Co., Ltd.) on a 50 cm×50 cm hot press, under vacuum, and at a temperature increase rate of 3° C./min. After the stack was heated at 300° C. for 30 minutes, a pressure of 5 MPa was applied to the stack, and the stack was further heated for 30 minutes. Thereafter, the stack was heated to 370° C. at a temperature increase rate of 2° C./min while remaining under pressure, and then was maintained at 370° C. for 1 hour. The stack was cooled, so that a carbon fiber reinforced composite material (CFRP-1) having an average thickness of 4.06 mm was obtained. In Example 1, no prepreg was isolated. A fiber volume content (Vf) estimated from the weight of the carbon fiber reinforced composite material (CFRP-1) which had been molded was 53.7%. FIG. 1 shows a result of observation of a cross section of the carbon fiber reinforced composite material (CFRP-1). In FIG. 1, a whitish part (black arrow in FIG. 1) shows carbon fibers, and a gray part (white arrow in FIG. 1) shows a polyimide resin. A void or an unimpregnated part is observed as a black part. However, no black part was observed in FIG. 1. It was determined from this that the cross section of the carbon fiber reinforced composite material (CFRP-1) of Example 1 had no void or no unimpregnated part. Furthermore, the carbon fiber reinforced composite material (CFRP-1) was subjected to measurement of Tg with use of DMA, and the Tg was 385° C.

Comparative Example 1

A device for producing a prepreg was used to impregnate the terminally modified imide oligomer NMP solution (varnish) (N1), obtained in Production Example 1, into carbon fibers (PYROFIL MR50R12M, manufactured by Mitsubishi Rayon Co., Ltd.) and dry the carbon fibers into which the terminally modified imide oligomer NMP solution (varnish) (N1) had been impregnated, so that a unidirectional wet prepreg (W1) (fiber mass per unit area: 140 g/m$^2$) was produced. The wet prepreg produced had a terminally modified imide oligomer content of 30.5 wt %, a volatile component content of 13 wt %, and a carbon fiber content of 56.5 wt %. That is, 30 wt % of the volatile component remained with respect to the terminally modified imide oligomer, and a fiber volume content (Vf) was estimated at 57.2%. The term "prepreg" is used here to mean that the imide oligomer is perfectly impregnated into the carbon fibers.

Figure 2:
FIG. 2 is a view illustrating a cross section, observed by use of an optical microscope, of a carbon fiber reinforced composite material (CFRP-2) of Comparative Example 1.

The wet prepreg (W1) was cut so as to have a size of 300 cm×300 cm and was layered so as to have a structure of [45/0/−45/90]4s(32ply). Thereafter, the wet prepreg (W1) was subjected to vacuum bagging with use of subsidiary materials (a Teflon (Registered Trademark) sheet, a peel ply, a bleeder cloth, a stainless steel plate, an air breather, and a vacuum bag) and placed in an autoclave. The bag was heated to 288° C. at a temperature increase rate of 3° C./min under reduced pressure. The bag was maintained at 288° C. for several ten minutes, then heated to 370° C. at a temperature increase rate of 2° C./min, and thereafter maintained at 370° C. for 1 hour at 1.4 MPa. The bag was cooled, so that a carbon fiber reinforced composite material (CFRP-2) having an average thickness of 4.10 mm was obtained. FIG. 2 shows a result of observation of a cross section of the carbon fiber reinforced composite material (CFRP-2). In FIG. 2, a whitish part shows carbon fibers, and a gray part shows a polyimide resin. A void or an unimpregnated part is observed as a black part. For example, in FIG. 2, many black parts are found in parts indicated by arrows or enclosed by white circles. It was determined from this that many voids were present in the CFRP-2. Though an attempt to measure Tg of the carbon fiber reinforced composite material (CFRP-2) was made, it was impossible to cut the carbon fiber reinforced composite material well because the carbon fiber reinforced composite material was in an extremely bad state due to, for example, the voids. Thus, the attempt was abandoned.

Comparative Example 21

Figure 3:
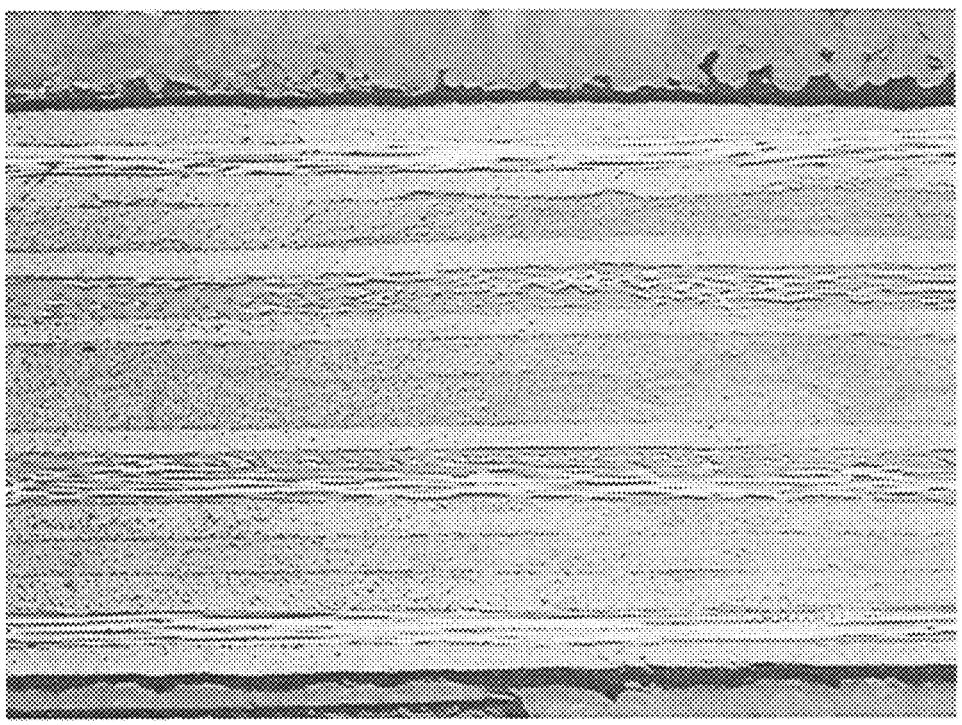
FIG. 3 is a view illustrating a cross section, observed by use of an optical microscope, of a carbon fiber reinforced composite material (CFRP-3) of Comparative Example 2.

Comparative Example 2 obtained a carbon fiber reinforced composite material (CFRP-3) having an average thickness of 2.01 mm as in the case of Comparative Example 1 except that Comparative Example 2 changed the layered structure of Comparative Example 1 from [45/0/−45/90]4s (32ply) to [45/0/−45/90]2s(16ply). FIG. 3 shows a result of observation of a cross section of the carbon fiber reinforced composite material (CFRP-3). In FIG. 3, a clear black part showing a void, an unimpregnated part, or the like was not observed. Furthermore, the carbon fiber reinforced composite material (CFRP-3) was subjected to measurement of Tg with use of DMA, and the Tg was 313° C.

Comparative Example 31

A film-like cured product (thickness: 90 µm) was obtained by heating, with use of a hot press for 1 hour at 370° C., the terminally modified imide oligomer in powder form (P2), which had been obtained in Production Example 4. The film-like cured product was used to be subjected to measurement of a 5% weight reduction temperature in air, and the 5% weight reduction temperature in air was 516° C.

Example 2

On opened plain-woven carbon fiber material ("SA-3203", manufactured by Sakai Ovex Co., Ltd., fiber mass per unit area: 63 g/m$^2$), which had been cut so as to have a size of 12 cm×12 cm and had been priorly subjected to de-sizing by being immersed in acetone and then dried, 0.65 g of the terminally modified imide oligomer powders (P3) obtained in Production Example 6 were placed so as to be homogenously dispersed. The terminally modified imide oligomer powders (P3) thus placed on the opened plain-woven carbon fiber material were sandwiched by release polyimide films and further sandwiched by 20 cm×20 cm stainless steel plates, so that a stack was obtained. Then, the stack was heated at 290° C. for 5 minutes under a slight pressure with use of a pressing machine (MINI TEST PRESS•10, manufactured by Toyo Seiki Seisaku-sho, Ltd.). Thereafter, the stack was pressed at 290° C. for 30 minutes while a pressure of 6.9 MPa was applied thereto. An opened plain-woven prepreg (D2) was thus obtained. The opened plain-woven prepreg was found to have a volatile component content of 0.1 wt % with respect to the imide oligomer.

By a method similar to the above method, 32 opened plain-woven prepregs were produced. A fiber weight content estimated from the opened plain-woven carbon fiber material weight obtained before the opened plain-woven prepregs had been produced and the opened plain-woven prepreg weight obtained after the opened plain-woven prepregs had been produced was 60 wt % on average. Assuming that a carbon fiber density was 1.8 g/cm³ and a terminally modified imide oligomer density was 1.3 g/cm³, Vf was estimated at 52%.

Figure 4:
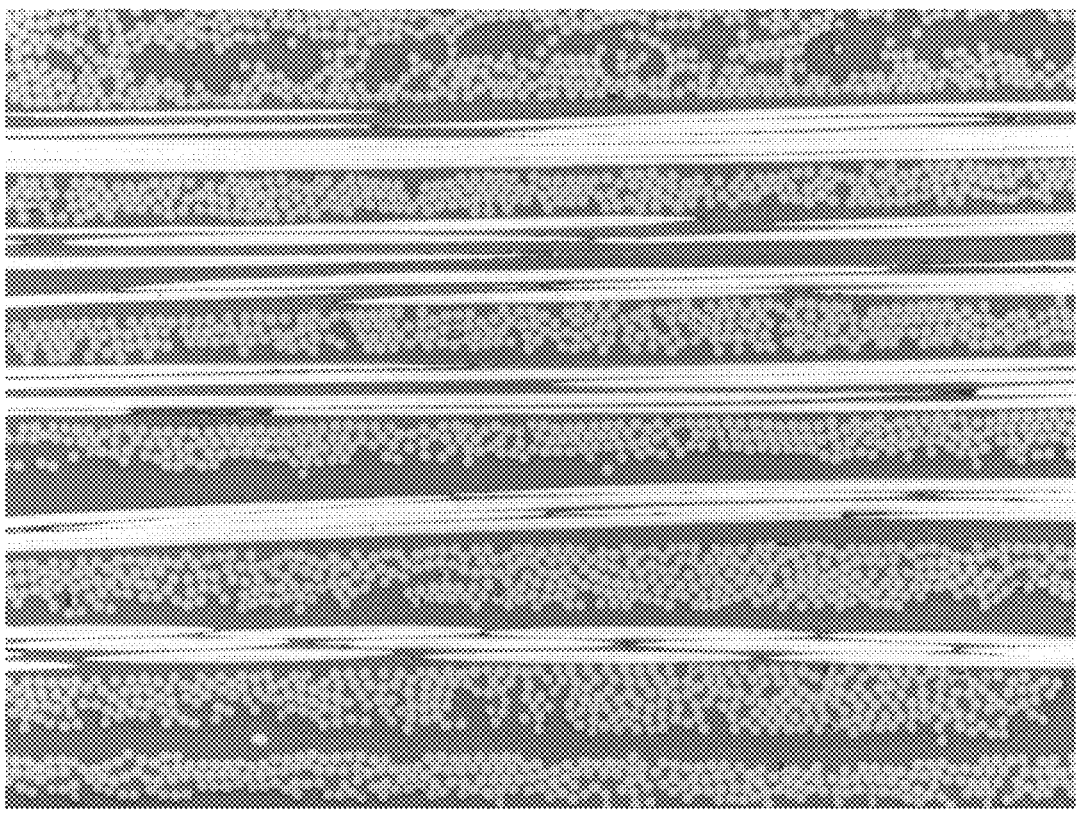
FIG. 4 is a view illustrating a cross section, observed by use of an optical microscope, of a carbon fiber reinforced composite material (CFRP-4) of Example 2.

The opened plain-woven prepregs were each cut so as to have a size of 10 cm×10 cm, and 32 opened plain-woven prepregs were layered. The stack was wrapped in a release polyimide film and sandwiched by 20 cm×20 cm stainless steel plates. The stack was heated at 290° C. for 30 minutes in air with use of a pressing machine and then subjected to repeated pressure application and pressure reduction (pumping) in the range of 0.1 MPa to 5 MPa 30 times. Thereafter, a pressure of 10 MPa was applied to the stack, and the stack was further heated for 90 minutes. Thereafter, the stack was heated to 370° C. while remaining under pressure, and then was maintained at 370° C. for 1 hour. Then, the stack was cooled to room temperature while remaining under pressure, so that a carbon fiber reinforced composite material (CFRP-4) having an average thickness of 2.29 mm was obtained. In Example 2, a prepreg was isolated as described above. FIG. 4 shows a result of observation of a cross section of the carbon fiber reinforced composite material (CFRP-4). Since hardly any black part was observed in FIG. 4, it was determined that hardly any void or unimpregnated part was present in the carbon fiber reinforced composite material (CFRP-4). Furthermore, the carbon fiber reinforced composite material (CFRP-4) was subjected to measurement of Tg with use of DMA, and the Tg was 374° C.

[Consideration of Results]

In Examples 1 and 2, a volatile component such as a solvent had been sufficiently removed in a phase of a semipreg or a prepreg. Thus, it was possible to obtain a favorable carbon fiber reinforced composite material having no defect (e.g., void or unimpregnated part) and having Tg equal to or higher than that of a simple resin. In contrast, it is considered that an extremely bad carbon fiber reinforced composite material was obtained in Comparative Example 1 because of the following reason. Specifically, it was impossible to remove, during forming of a composite material, a solvent (NMP) contained in a wet prepreg. This caused the NMP to expand in the composite material, so that many voids were formed. Furthermore, in Comparative Example 2, NMP was easily rid of by using a composite material smaller in thickness than the composite material of Comparative Example 1, so that no clear defect (e.g., void) was found. However, the composite material had Tg much lower than that of a simple resin. This seems to be because an plasticizing effect of the NMP remaining in the composite material causes the composite material to have lower Tg. Comparative Example 3 used an imide oligomer different in molecular structure from Examples and having a relatively low degree of polymerization (being a monomer to a dimer). Thus, the imide oligomer used in Comparative Example 3 was lower in 5% weight reduction temperature than the imide oligomer used in Example 1.

INDUSTRIAL APPLICABILITY

The present invention can be used in a wide range of fields requiring easy moldability and high heat resistance, including the fields of aircraft and space industry devices, general industrial uses, and vehicle engine (peripheral) members.

The invention claimed is:

1. A method for producing a resin composite material, comprising:
   (a) producing a semipreg or a prepreg by adhering powders of an imide oligomer to reinforcement fibers and then carrying out heating;
   (b) obtaining a stack by layering the semipreg or the prepreg obtained in (a), and then maintaining the stack at a temperature of from 260° C. to 320° C. and pressure of from 0.1 MPa to 20 MPa for 5 minutes to 300 minutes; and
   (c) after (b), further maintaining the stack at a temperature of from 330° C. to 500° C. and and pressure of from 0.1 MPa to 20 MPa for 15 minutes to 120 minutes.

2. The method of claim 1, wherein the imide oligomer is represented by the following formula (2):

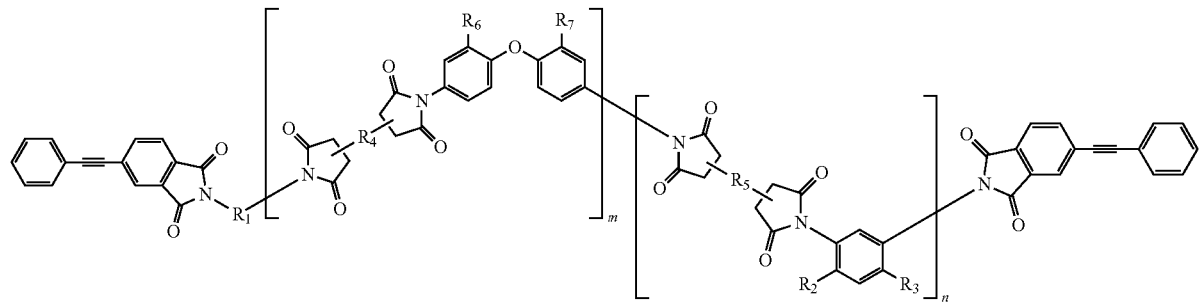

(2)

wherein $R_1$ represents a divalent residue of an aromatic diamine selected from the group consisting of 2-phenyl-4,4'-diaminodiphenylether and 4-phenoxy-1,3-diaminobenzene;
one of $R_2$ and $R_3$ represents a phenoxy group, and the other one of $R_2$ and $R_3$ represents a hydrogen atom;
$R_4$ and $R_5$, which are identical or different, each represent a tetravalent residue of an aromatic tetracarboxylic acid;
one of $R_6$ and $R_7$ represents a phenyl group, and the other one of $R_6$ and $R_7$ represents a hydrogen atom;
m and n satisfy the following:
    $1<m$,
    $0<n<5$,
    $1<m+n<10$, and
    $0.5<m/(m+n)<1$; and
a sequence of repeating units is a block sequence or a random sequence.

3. The method of claim 2, wherein m+n is not less than 4 in the imide oligomer.

4. The method of claim 1, wherein a volatile component remains in an amount of less than 20 wt % with respect to the imide oligomer.

5. The method of claim 1, wherein the imide oligomer has a minimum melt viscosity of 1 Pa-sec to 20000 Pa-sec.

6. The method of claim 1, wherein the imide oligomer has a melt viscosity at 280° C. of 200 Pa-sec to 1000000 Pa-sec.

7. The method of claim 1, wherein a polyimide resin which is obtained by curing by heating in (a) the imide oligomer has a 5% weight reduction temperature in air of at least 520° C.

8. The method of claim 1, further comprising, before (a), opening a fiber bundle of the reinforcement fibers.

9. The method of claim 1, wherein the imide oligomer is represented by the following formula (1):

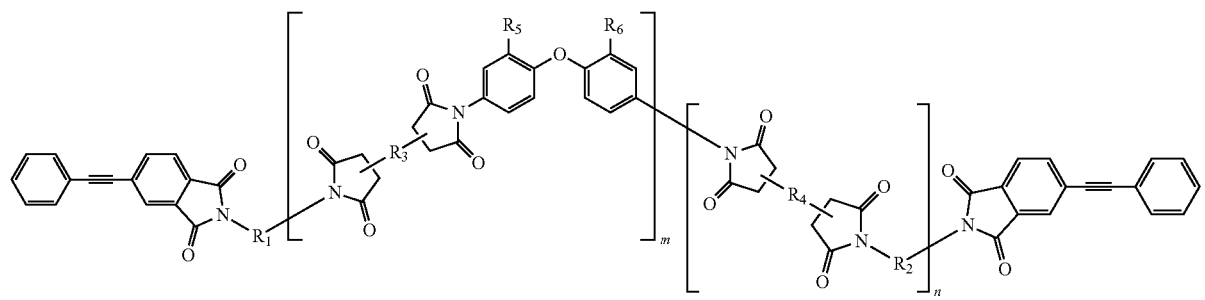

wherein $R_1$ represents a divalent residue of at least one aromatic diamine selected from the group consisting of 2-phenyl-4,4'-diaminodiphenylether, 9,9-bis(4-aminophenyl)fluorene, 9,9-bis(4-(4-aminophenoxy)phenyl) fluorene, 1,3-diaminobenzene, and 4-phenoxy-1,3-diaminobenzene;

$R_2$ represents a divalent residue of at least one aromatic diamine selected from the group consisting of 9,9-bis(4-aminophenyl)fluorene, 9,9-bis(4-(4-aminophenoxy)phenyl)fluorene, 1,3-diaminobenzene, and 4-phenoxy-1,3-diaminobenzene;

$R_3$ and $R_4$, which are identical or different, each represent a tetravalent residue of an aromatic tetracarboxylic acid;

one of $R_5$ and $R_6$ represents a phenyl group, and the other one of $R_5$ and $R_6$ represents a hydrogen atom;

m and n satisfy the following:

$1 \leq m$,
$0 \leq n < 5$,
$1 < m+n < 10$, and
$0.5 < m/(m+n) \leq 1$; and a sequence of repeating units is a block sequence or a random sequence.

10. The method of claim 1, wherein in (a), the powders of the imide oligomer are adhered to the reinforcement fibers by mixing the powders of the imide oligomer and the reinforcement fibers in a dry state without using a solvent or a dispersion medium.

11. The method of claim 1, wherein in (a), the semipreg is obtained by being heated and melted at a temperature of from 230° C. to 370° C. and a pressure of from 0.1 MPa to 20 MPa for 0.1 minutes to 10 minutes after the powders of the imide oligomer are adhered to the reinforcement fibers.

12. The method of claim 11, wherein in (a), the prepreg is obtained by heating and melting the semipreg, thereby impregnating the imide oligomer into the reinforcement fibers.

13. The method of claim 12, wherein in (a), the prepreg is obtained by heating and melting the semipreg at a temperature of at least 250° C. for 0.1 minutes to 20 minutes, thereby impregnating the imide oligomer into the reinforcement fibers.

* * * * *